(12) United States Patent
Viola et al.

(10) Patent No.: US 7,020,337 B2
(45) Date of Patent: Mar. 28, 2006

(54) SYSTEM AND METHOD FOR DETECTING OBJECTS IN IMAGES

(75) Inventors: Paul A. Viola, Brookline, MA (US); Michael J. Jones, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 723 days.

(21) Appl. No.: 10/200,464

(22) Filed: Jul. 22, 2002

(65) Prior Publication Data

US 2004/0013304 A1    Jan. 22, 2004

(51) Int. Cl.
*G06K 9/62* (2006.01)
*G06K 9/00* (2006.01)

(52) U.S. Cl. ............... 382/224; 382/118; 382/190; 382/195; 706/20

(58) Field of Classification Search ............... 382/115, 382/118, 190, 195, 224, 225; 706/12, 20
See application file for complete search history.

(56) References Cited

U.S. PATENT DOCUMENTS 6,198,839 B1 * 3/2001 Kuan et al. ............ 382/133
6,337,927 B1   1/2002 Elad et al. ............ 382/225
6,356,649 B1 * 3/2002 Harkless et al. ............ 382/115
6,574,596 B1 * 6/2003 Bi et al. ............ 704/249

OTHER PUBLICATIONS

Viola et al., Robust Real-time Object Detection, Feb. 2001, Cambridge Research Laboratory, pp. 1-24.*
Viola et al. "*Rapid object detection using a boosted cascade of simple features*," Proceedings IEEE Conf. on Computer Vision and Pattern Recognition, 2001.

* cited by examiner

*Primary Examiner*—Bhavesh M Mehta
*Assistant Examiner*—John Strege
(74) *Attorney, Agent, or Firm*—Dirk Brinkman; Andrew J. Curtin

(57) ABSTRACT

A method detects an object, such a face, in an image. The image is first partitioned into patches of various sizes using either an integral image or a Gaussian pyramid. Features in each patch are evaluated to determine a cumulative score. The evaluating is repeated while the cumulative score is within a range of an acceptance threshold and a rejection threshold, and otherwise the image is rejected when the accumulated score is less than the rejection threshold and accepted as including the object when the cumulative score is greater than the acceptance threshold.

10 Claims, 3 Drawing Sheets

SYSTEM AND METHOD FOR DETECTING OBJECTS IN IMAGES

FIELD OF THE INVENTION

This invention relates generally to the field of computer vision and pattern recognition, and more particularly to detecting objects such as faces in images.

BACKGROUND OF THE INVENTION

Of all of the applications where computer vision is used, face detection presents an extremely difficult challenge. For example, in images acquired by surveillance cameras, the lighting of a scene is usually poor and uncontrollable, and the cameras are of low quality and usually distant from potentially important parts of the scene. Significant events are unpredictable. Often, a significant event is people entering a scene. People are typically identified by their faces. The location and orientation of the faces in the scene are usually not controlled. In other words, the images to be analyzed are substantially unconstrained.

In applications where a large number of images are to be analyzed, or the analysis needs to be performed in real-time, the number of images that actually include faces is usually very small. Moreover, in most images that do include a face, the amount of the image that is a face is also very small. Therefore, it is desirable to rapidly eliminate images or portions of images that do not include a face, thus more processing can be devoted to portions of images that potentially contain a face.

Face detection has a long and rich history. Some techniques use neural network systems, see Rowley et al., "Neural network-based face detection," *IEEE Patt. Anal. Mach. Intell.*, Vol. 20, pages 22–38, 1998. Others use Bayesian statistical models, see Schneiderman et al., "A statistical method for 3D object detection applied to faces and cars," *Computer Vision and Pattern Recognition*, 2000. While neural network systems are fast and work well, Bayesian systems have better detection rates at the expense of longer processing time.

U.S. Pat. No. 5,710,833, "Detection, recognition and coding of complex objects using probabilistic eigenspace analysis" issued to Moghaddam, et al. on Jan. 20, 1998, describes a system for detecting instances of a selected object or object feature, e.g., faces, in a digitally represented scene. Their method utilizes analysis of probability densities to determine whether an input image, or portion thereof, represents such an instance.

U.S. Pat. No. 6,337,927, "Approximated invariant method for pattern detection" issued to Elad et al. on Jan. 8, 2002, describes a system and method for classifying input feature vectors into one of two classes, a target class (faces) and a non-target class (non-faces). The system utilizes iterative rejection stages to first label the input vectors that belong in the non-target class in order to identify the remaining non-labeled input vectors as belonging in the target class. The operation of their system is divided into an off-line (training) procedure and an online (actual classification) procedure.

During the off-line procedure, projection vectors and their corresponding threshold values that will be used during the on-line procedure are computed using a training set of sample non-targets and sample targets. Each projection vector facilitates identification of a large portion of the sample non-targets as belonging in the non-target class for a given set of sample targets and sample non-targets.

During the on-line procedure, an input vector is successively projected onto each computed projection vector and compared with a pair of corresponding threshold values to determine whether the input vector is a non-target. If the input vector is not determined to be a non-target during the successive projection and thresholding, the input vector is classified as a target.

As a disadvantage, the features used by their method are limited to linear projections and upper and lower thresholds. Thus, outcomes of early features do not effect the outcomes of later tests. In other words, their tests can be reordered with no effect on the final result. In addition, because the classifier is a conjunction of linear projections followed by a threshold, the resulting classification function is limited to a convex region in the input space, which is a strong limitation that makes their system a weak classifier.

A new framework for feature detection is described by Viola et al., in "Rapid Object Detection using a Boosted Cascade of Simple Features," *Proceedings IEEE Conf. on Computer Vision and Pattern Recognition*, 2001. They present three new insights: a set of image features which are both extremely efficient and effective for face analysis, a feature selection process based on Adaboost, and a cascaded architecture for learning and detection. Adaboost provides an effective learning algorithm and strong bounds on generalized performance, see Freund et al., "A decision-theoretic generalization of on-line learning and an application to boosting," *Computational Learning Theory*, Eurocolt '95, pages 23–37. Springer-Verlag, 1995, Schapire et al., "Boosting the margin: A new explanation for the effectiveness of voting methods," *Proceedings of the Fourteenth International Conference on Machine Learning*, 1997, Tieu et al., "Boosting image retrieval," *International Conference on Computer Vision*, 2000.

However, there are several problems with their cascaded approach. The simplest is that the cascade allows only for rejection thresholds, and does not have acceptance thresholds. This degrades performance when the distribution of acceptable and rejected examples are substantially equal.

Another disadvantage of their method is that later stages of the cascade ignore detailed information that was available during earlier stages of the cascade. If the early cascade stages accept features only marginally close to the threshold, then this useful information plays no role in later decisions to reject or accept the feature. For example, it is possible for multiple stages to accept a given patch because it is significantly above the rejection threshold, and then subsequently reject that patch as soon as it falls below the rejection threshold in later stages. In this case it is often better to accept the given patch.

Another disadvantage is their mechanism for setting the rejection thresholds. Their rejection thresholds are set for each cascade stage starting from the first stage. For any given task, their goal is to detect most of the objects, though it is impossible to detect all objects of a particular class. In the case of face detection, perhaps 90% to 95% of the faces are detected. The rejection threshold is set so that a very high percentage of the examples are detected. Therefore, in the early stages, one must be very conservative and not discard a potentially correct patch. For early stages in the cascade, 99% or more of the objects must be detected in order to ensure that valuable patches are not discarded.

Their process does not distinguish example patches that are easy to classify, and are eventually classified correctly, and those example patches, which are very difficult to classify and are eventually misclassified. If one could determine which example patches would eventually be misclassified, after the entire cascade, then those example patches could be eliminated early with no loss to the accuracy of the overall process. Because the rejection threshold setting process starts with the early stages of the cascade, these "difficult" examples cannot be identified so the rejection threshold is set for all positive examples. This results in rejection thresholds which are lower and less effective in reducing processing time.

Therefore, there is a need for an object detection system that improves upon the prior art.

SUMMARY OF THE INVENTION

A method detects an object, such a face, in an image. The image is first partitioned into patches of various sizes using either an integral image or a Gaussian pyramid.

Features in each patch are evaluated to determine a cumulative score. The evaluating is repeated while the cumulative score is within a range of an acceptance threshold and a rejection threshold.

Otherwise, the image is rejected when the accumulated score is less than the rejection threshold and accepted as including the object when the cumulative score is greater than the acceptance threshold.

DETAILED DESCRIPTION OF THE PREFERRED EMBODIMENT

Overview of System Structure and Operation

Figure 1:
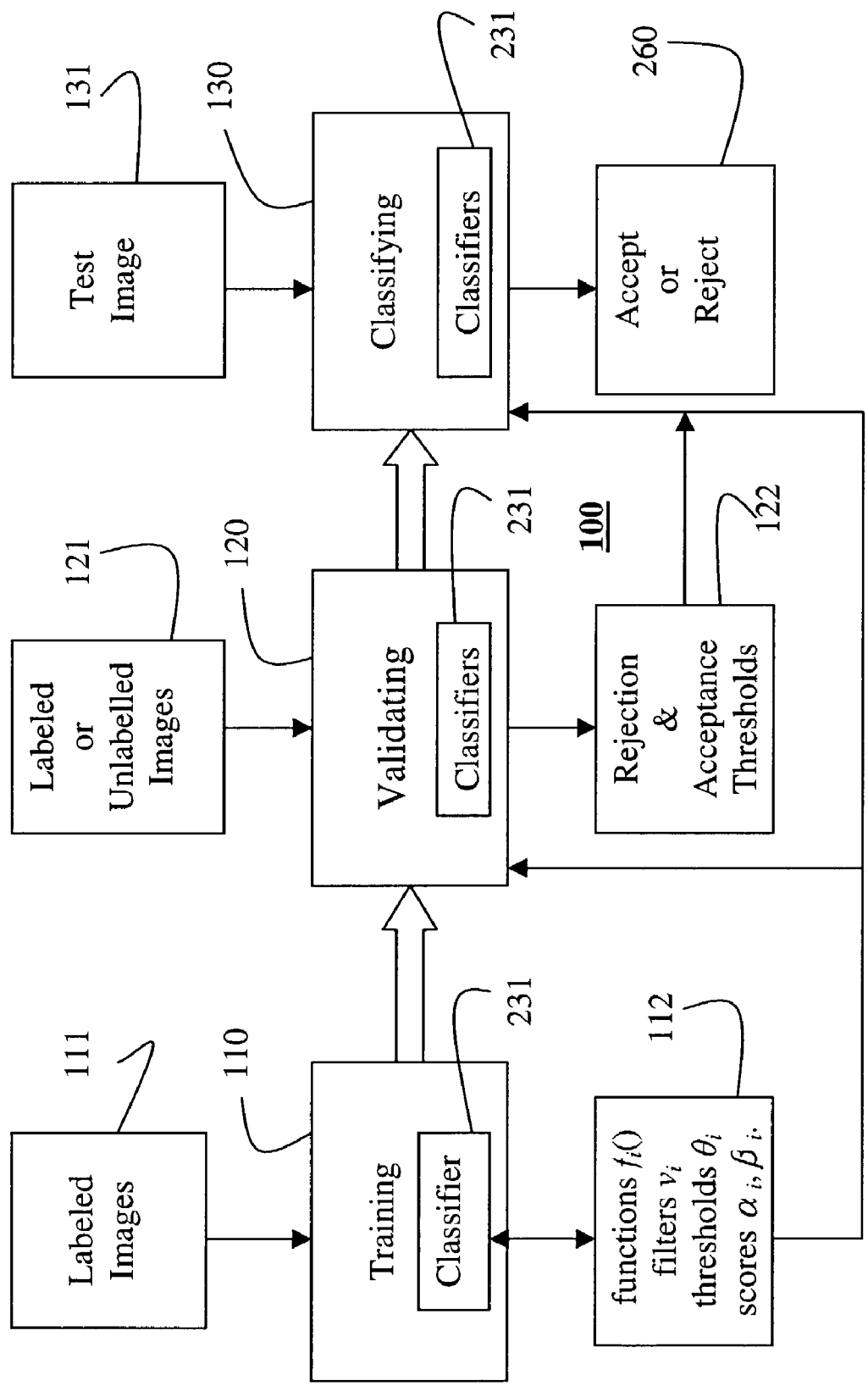
FIG. 1 is a block diagram of an object detection system and method according to the invention.

FIG. 1 shows a system and method 100 for detecting objects in images according to the invention. In one application, the objects detected in the images are faces, however, it should be understood that other objects can also be detected. The system 100 includes three fundamental phases, training 110, validating 120, and classifying 130.

The training phase 110 takes as input a first set of labeled images 111. The nature of what is labeled in the images 111 determines what objects are detected. The labeled images 110 are processed to produce classifiers 231. As described in greater detail below, the processing uses a machine learning process to find an optimal set of parameters 112 for the classifiers 231.

The parameters 112 includes a sum of features. A feature is a function $f_i(\ )$ of a filter $v_i$ applied to an image patch i and then compared to comparison threshold $\theta_i$ to yield either an acceptance score $\alpha_i$ or a rejection score $\beta_i$. The parameters 112 include the functions $f_i(\ )$ that can be linear or non-linear, the filters $v_i$, the comparison thresholds $\theta_i$ and the acceptance and rejection scores $\alpha_i$ and $\beta_i$. The filters are evaluated as a linear projections of the input patch represented as a vector onto the vector $v_i$. All of these parameters, $f_i$, $v_i$, $\alpha_i$ $\beta_i$, and $\theta_i$ that specify the classifiers 231 are determined by the learning process to give a lowest error on the labeled training images 111.

The validating phase 120 processes a second set of labeled images 121, using the classifiers 231, to produce acceptance thresholds $T_a$ and rejection thresholds $T_r$ 122 for the classifiers 231.

The classifying phase 130 applies the classifiers 231, whose parameters 112 and thresholds 122 are learned in the training 110 and validating 120 phases, to an input image to find all instances of the object (face) in the image. Using the parameters 112 and the thresholds 122, the classifying phase 130 accepts or rejects 260 a test image 131 as belonging to a predetermined class. For, example, the test image is accepted if it includes a face, and otherwise, the test image is rejected. The details of the phases, parameters and thresholds are described in greater detail below. It should be noted, however, that the basic comparison operation of the processing of each of the three phases is identical, as shown in FIG. 2.

Pre-Processing

Figure 2:
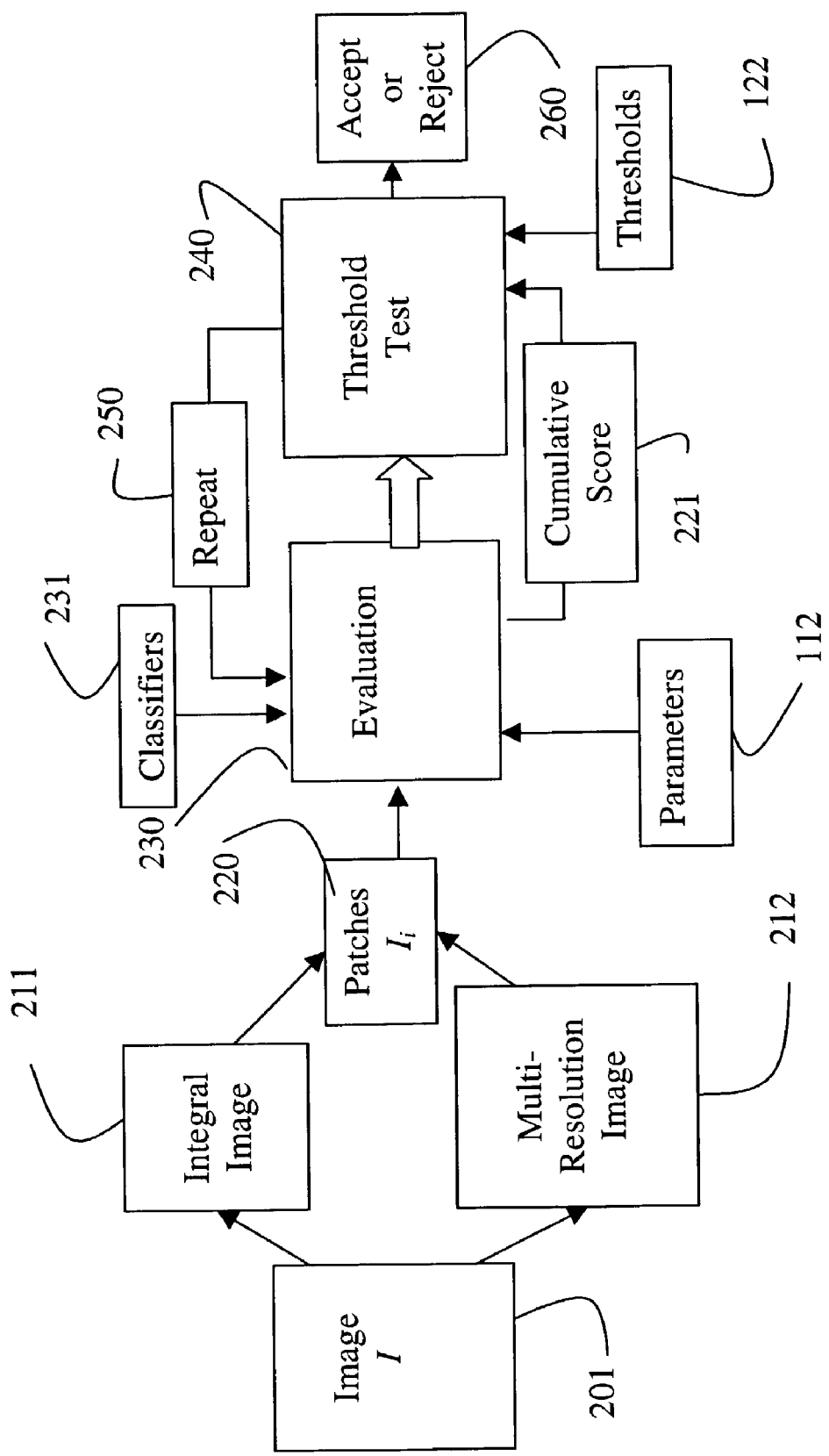
FIG. 2 is a block diagram of a comparison process according to the invention.

Because the object to be detected in the images can be any size and at any location, each input image I 201 is first partitioned into "patches" ($I_i$) 220 scaled to various sizes, as shown in FIG. 2. Therefore, in detail, the processing on the images as described for FIG. 1 actually takes place on the patches 220. The shape of the patches 220 can be square, rectangular or other shapes, and the location of the patches can be overlapping or unique. For example, a first patch size is the entire image, and subsequent smaller patches are each scaled down by 75% to a predetermined minimum patch size, e.g., 24×24 pixels.

The scaling of the patches can be done in any number of ways. In one way, the scaling of each image 201 is performed using an integral image 211, see Viola et al. cited above. In another way, the scaling is performed using a multi-resolution image 212, e.g., a Gaussian or Lapacian pyramid, see Burt et al., "The Laplacian Pyramid as a Compact Image Code," *IEEE Trans. on Communications*, 31(4):532–540, April 1983. In another way, the scaling is accommodated via the projection. In the preferred embodiment, the patches are processed (compared) in a raster-scan, large-to-small order.

Feature Evaluation and Classification

During the processing of the images, each patch, labeled or unlabeled, is evaluated 230 according to the classifiers 231. The classifiers 231 include sums of features that are shaped and sized to match the patches 220. For example, rectangular features, similar to Haar basis functions, can be used, see Papageorgiou et al., "A general framework for object detection," *International Conference on Computer Vision*, 1998, and Viola et al. above, and also see Webb et al., "Shape and correspondence," *Computer Vision, Graphics, and Image Processing*, 21:145–160, 1983. It should be noted that the present invention is not restricted to these types of features. In the preferred embodiment, the number of features can exceed hundreds of thousands.

Each evaluation 230 of each feature on one of the patches produces a score 221 that is either the acceptance score $\alpha$ or the rejection score $\beta$. The score is accumulated. For the input image 201, the cumulative score 221 is initially set to zero. The evaluation 230 is repeated 250 while the cumulative score 221 is within the range of the acceptance and rejection thresholds 122, otherwise the image is either accepted or rejected 260.

This evaluation in step 230 can be expressed as:

If $f(v_i, I_i) > \theta_i$, then $h(i) = \alpha$, otherwise $h(i) = \beta$, where $f(\ )$ is a either a linear or non-linear function of the parameters $v_i$ and the image patch $I_i$, the comparison threshold is $\theta_i$, and $\alpha$ and $\beta$ are the acceptance and rejection weights, respectively. The function $f(\ )$ can also be a dot product between $I_i$ and v expressed as vectors. The value of the dot product can be modified by a non-linear function, such as an absolute value.

The process of step 240 can be expressed as:

If $T_r(N) < \Sigma_{i=1 \ldots N} h(i) < T_a(N)$ then repeat, otherwise accept or reject 260.

Figure 3:
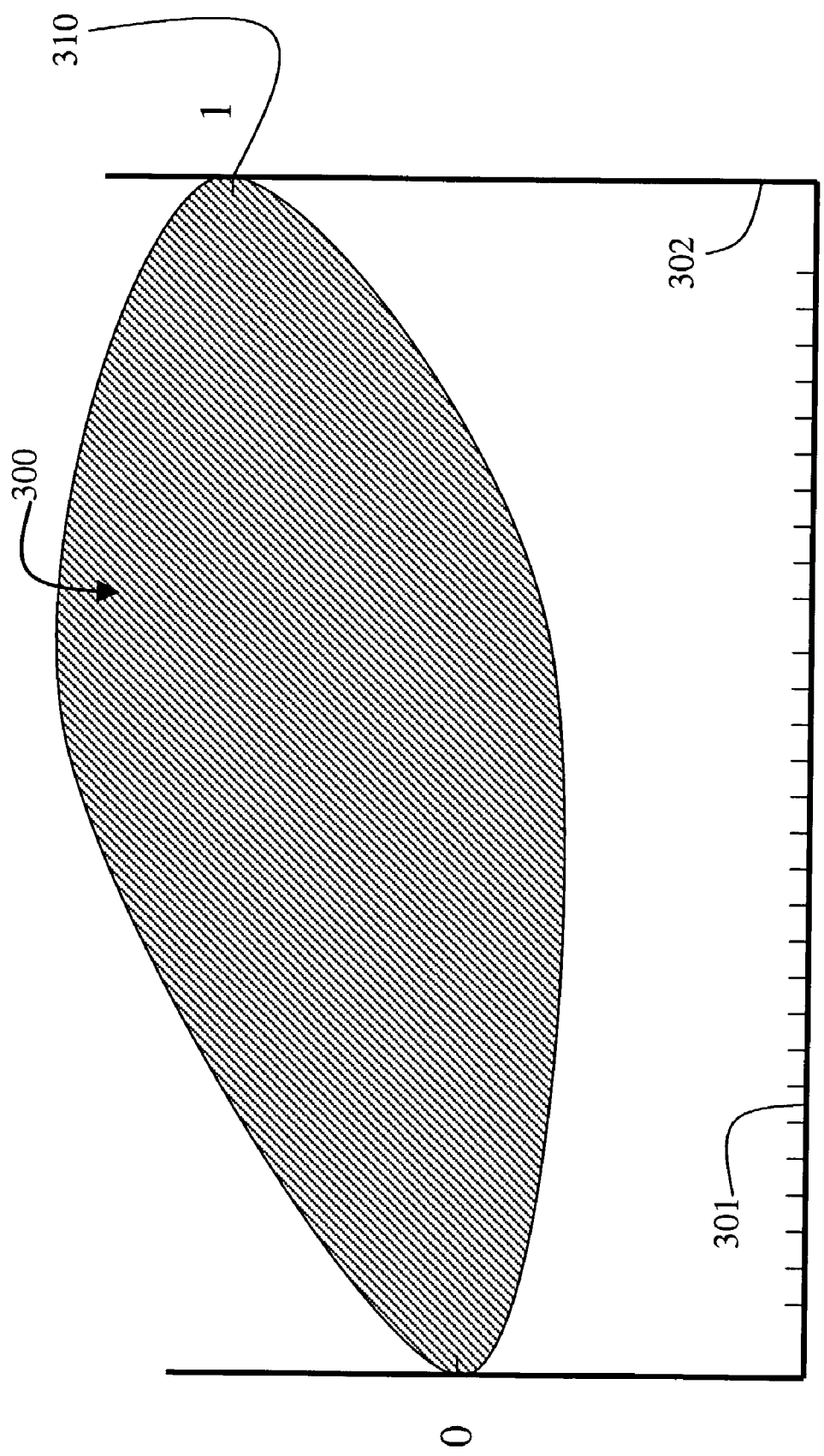
FIG. 3 is a graph of an acceptance/rejection envelope used by the invention.

FIG. 3 shows an acceptance and rejection "envelope" 300 learned during the validating 120 phase, and used during classifying phase. The x-axes 301 indicates the repeated number of comparisons, and the y-axes 302 the cumulative rejection (0) and acceptance (1) levels. If, at any time, the cumulative score 221 falls below the envelope 300, then the likelihood that the patch will be accepted is so low that there is no point in continuing the comparison for additional patches. Similarly, if the cumulative score 221 rises about the envelope 300, then the likelihood of rejection is also negligible. Note, this cumulative probabilistic approach is to be contrasted with the hard binary classifiers of the prior art, which is based only on reaching a rejection threshold.

Training

The training images 111 include positive and negative labeled patches. The training process proceeds in rounds. Each training patch is assigned an initial score. This score can be equal for all patches, or different classes can be assigned different scores. The first feature selected for inclusion in the classifier 231 is that feature with the lowest weighted error on the training data. For the next round the scores on patches that the first feature mislabels are increased, and the scores on the correct patches are decreased. The next feature that is selected for inclusion is that feature with the lowest weighted error in the training data, given the new score. The set of examples can be reduced by removing examples with a score less than a predetermined amount. This can improve performance without reducing the quality of the overall classification.

Validating

The rejection and acceptance thresholds that form the envelope 300 are selected to minimize the probability of classification error while minimizing processing time. For example, the $k^{th}$ rejection threshold acts to reject a certain percentage of patches, with no additional processing. A higher rejection threshold leads to larger rates of rejection and a shorter computation time, because later stages are not evaluated. The risk is that a patch is incorrectly rejected. A lower rejection threshold leads to lower rates of rejection, and a longer computation time.

The advantage of a lower rejection threshold is that patches are analyzed with more classifiers, and the classification is therefore more reliable.

The process of selecting rejection/acceptance thresholds begins after N features are selected during the training phase 110. The final ($N^{th}$) acceptance and rejection thresholds are determined first. These thresholds are set based on desired performance goals. The goal can be either a detection rate, or a false positive rate. The rejection/acceptance threshold which achieves the performance goals is selected as the $N^{th}$ threshold. Note that the final acceptance and rejection thresholds are the same and equal to this final threshold 310, as shown in FIG. 3. This is because all examples that fall above both the acceptance and rejection threshold are accepted and those that fall below are rejected.

To set the other thresholds, a set of labeled validation patches, which may be identical to patches of the training images 111, is required. All other rejection thresholds are set with respect to the positive examples which are accepted and rejected by the final rejection threshold. The $k^{th}$ rejection threshold is the highest value so that it rejects only for those positive examples which are rejected by the final threshold. The $k^{th}$ acceptance threshold is the lowest value so that it accepts only for those negative examples which are accepted by the final threshold.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting an object in an image, comprising:
    evaluating a plurality of features in each image to determine a cumulative score, in which the cumulative score is increased by $\alpha_i$ if $f(v_i, I) > \theta_i$, and otherwise increased by $\beta_i$, where $f(\ )$ is a function of a projection $v_i$ of a particular patch $I_i$, $\theta_i$ is a comparison threshold, and $\alpha$ and $\beta$ are acceptance and rejection scores, respectively, and wherein the function is a dot product between $v_i$ and $I_i$ expressed as vectors;
    repeating the evaluating while the cumulative score is within a range of an acceptance threshold and a rejection threshold; and otherwise
    rejecting the image when the accumulated score is less than the rejection threshold and accepting the image as including the object when the cumulative score is greater than the acceptance threshold.

2. The method of claim 1 further comprising:
    partitioning the image into a plurality of patches;
    scaling the patches to a plurality of sizes.

3. The method of claim 2 wherein the scaling uses a multi-resolution image.

4. The method of claim 3 wherein the multi-resolution image is a Gaussian pyramid.

5. The method of claim 1 wherein the function $f(\ )$ is non-linear.

6. The method of claim 5 wherein the non-linear function is an absolute value.

7. The method of claim 1 wherein the parameters $v_i$, $\theta_i$, $\alpha_i$ and $\beta_i$ are determined during a training phase using a first set of labeled images.

8. The method of claim 1 wherein the first set of labeled images includes positive and negative labeled patches.

9. The method of claim 1 wherein the acceptance threshold and the rejection thresholds are determined during a validation phase using a second set of labeled images.

10. The method of claim 1 wherein the object is a face.

* * * * *